(12) United States Patent
Culp et al.

(10) Patent No.: US 6,973,453 B2
(45) Date of Patent: Dec. 6, 2005

(54) IMAGE COLLECTION ENHANCEMENT METHOD AND APPARATUS

(75) Inventors: Jerlyn R Culp, Fort Collins, CO (US); Michelle R. Lehmeier, Loveland, CO (US); Robert E Chalstrom, Fort Collins, CO (US); Steven D. Stoecker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 115 days.

(21) Appl. No.: 09/963,167

(22) Filed: Sep. 25, 2001

(65) Prior Publication Data

US 2003/0061236 A1 Mar. 27, 2003

(51) Int. Cl.$^7$ ............................................. G06F 17/30
(52) U.S. Cl. ........................ 707/5; 382/118; 382/165; 463/31
(58) Field of Search ................................ 382/305, 306, 382/307, 118, 165, 157; 707/1, 102, 104, 707/5; 358/403, 448, 453; 705/5; 463/31

(56) References Cited

U.S. PATENT DOCUMENTS

| | | | | |
|---|---|---|---|---|
| 5,990,901 A | * | 11/1999 | Lawton et al. | 345/581 |
| 6,115,495 A | * | 9/2000 | Tachikawa et al. | 382/165 |
| 6,202,061 B1 | * | 3/2001 | Khosla et al. | 707/3 |
| 6,301,586 B1 | * | 10/2001 | Yang et al. | 707/104.1 |
| 6,381,346 B1 | * | 4/2002 | Eraslan | 382/118 |
| 6,396,963 B2 | * | 5/2002 | Shaffer et al. | 382/305 |
| 6,526,167 B1 | * | 2/2003 | Numaoka | 382/157 |
| 6,741,983 B1 | * | 5/2004 | Birdwell et al. | 707/5 |
| 2003/0130035 A1 | * | 7/2003 | Kanarat | 463/31 |

* cited by examiner

Primary Examiner—Charles Rones

(57) ABSTRACT

An apparatus and method for enhancing an image collection. The invention is preferably embodied in computer readable program code. Program code may be provided for receiving image data for at least one user image in the image collection. Program code may also be provided for selecting at least one professional image based on the image data, and for formatting at least one attribute of the professional image based at least in part on the image data for inclusion with the image collection.

41 Claims, 6 Drawing Sheets

IMAGE COLLECTION ENHANCEMENT METHOD AND APPARATUS

FIELD OF THE INVENTION

The invention generally pertains to image collections, and more specifically, to methods and apparatus for enhancing an image collection.

BACKGROUND OF THE INVENTION

Travelers and families often record visual images of the places they visit with photographs or videos. These photographs or videos may help to preserve their memories and to share those memories with others. In addition, photographs or videos may be used for presentations, brochures, research papers, documentaries, etc. Relatively inexpensive, compact photographic and video equipment is readily available for such purposes.

Continually developing technologies make it easy for even the amateur to record quality visual images. For example, many still-image cameras and video recorders include preview screens, so that an image may be previewed "on the spot" and retaken, if necessary. In addition, equipment is also increasingly popular for capturing digital images. The digital images may be further altered using readily-available software applications (e.g., Adobe Photoshop®). These software applications allow even the amateur to edit or re-touch the photos, such as, for example to reduce "red-eye", to correct for poor lighting, to edit video streams, etc. The digital images also allow the amateur to readily share these images with others (e.g., via email over the Internet). Even traditional photographs may be readily converted to digital format using inexpensive and readily-available scanning equipment. In addition, high quality color printers are also readily available, reducing or altogether eliminating the need for traditional film processing.

Even with the equipment that is now readily available for recording and altering visual images, there are often circumstances where an image collection may be enhanced by supplementing it with additional images. For example, a vacation image collection may be supplemented with photographs or video clips of various landmarks during different seasons, in better lighting, in better weather, during a sunset, etc. Or for example, a vacation image collection may be supplemented with photographs or video clips of various landmarks that the traveler did not have time to visit. As yet another example, a speaker may desire to supplement a presentation on conservation with visual images of scenery from various National Parks.

One solution is to purchase professional photographs or slides, post cards, videos, etc., to supplement the image collection. However, the availability may be limited to a particular region (e.g., post cards of the Grand Canyon may only be readily available in Arizona). Likewise, the selection of images may be limited to only a few popular or well-known landmarks (e.g., the "Old Faithful" geyser in Yellowstone National Park). In addition, even where a good selection of images is widely available, the images are often of a different format from those of the image collection. For example, postcards are often printed on thicker, larger paper than 35 mm photograph prints. Indeed, an album of postcards must be viewed altogether separately from a video recording.

SUMMARY OF THE INVENTION

Apparatus for enhancing an image collection may be embodied in computer readable program code stored on computer readable storage media, according to one embodiment of the invention. The computer readable program code may comprise program code for receiving image data for at least one user image in the image collection. Program code may also be provided for selecting at least one professional image based on the image data, and for formatting at least one attribute of the professional image based at least in part on the image data for inclusion with the image collection.

Also disclosed is a method for enhancing an image collection that may comprise the steps of: electronically determining a category of at least one user image in the image collection, selecting at least one professional image based on the category of the at least one user image, formatting the at least one selected professional image to substantially match at least one attribute of the at least one user image, and providing the at least one formatted professional image to a user for inclusion with the image collection.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
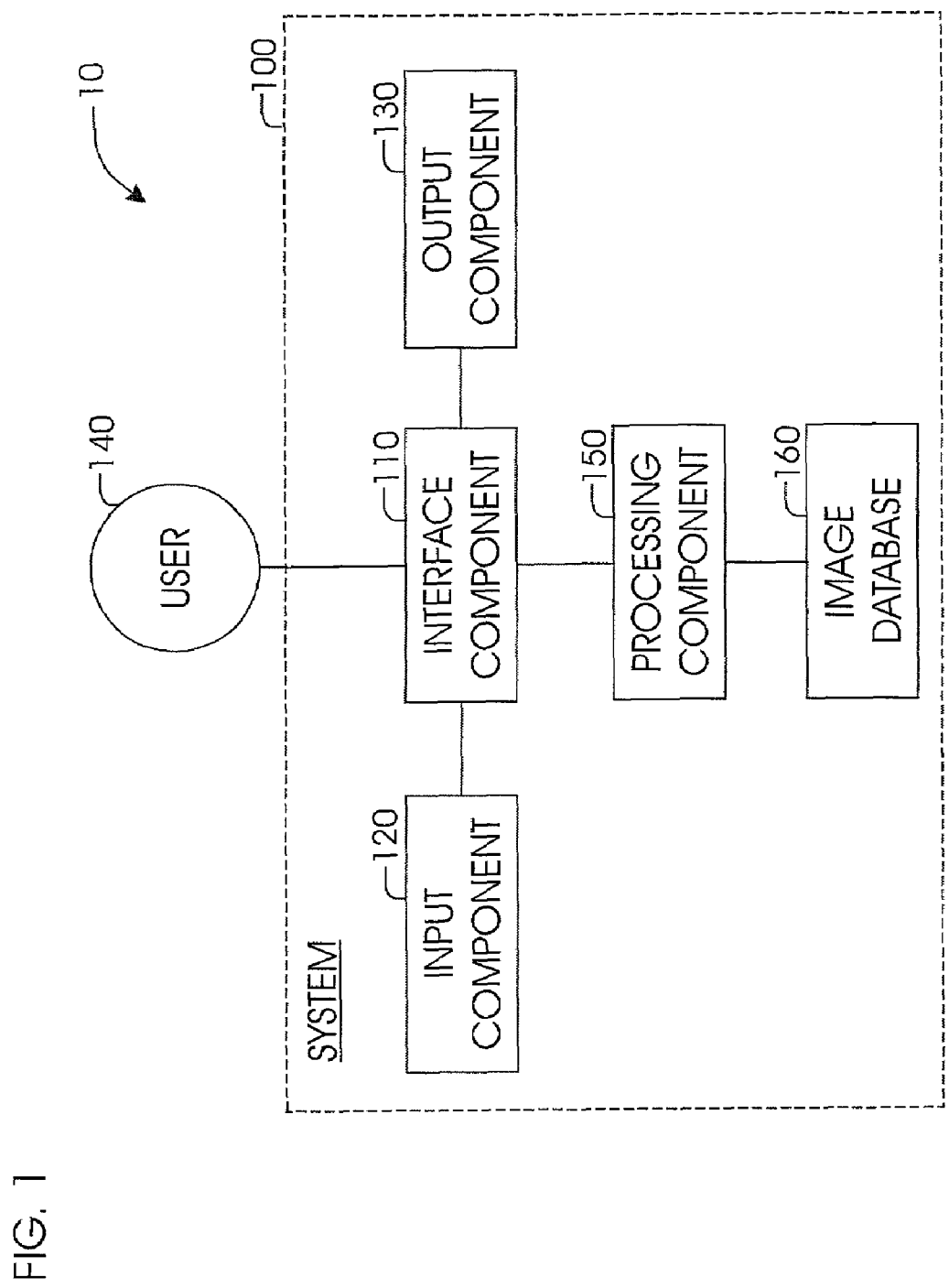
FIG. 1 is a high level diagram illustrating a system embodiment of the invention for enhancing an image collection with professional images.
Figure 2:
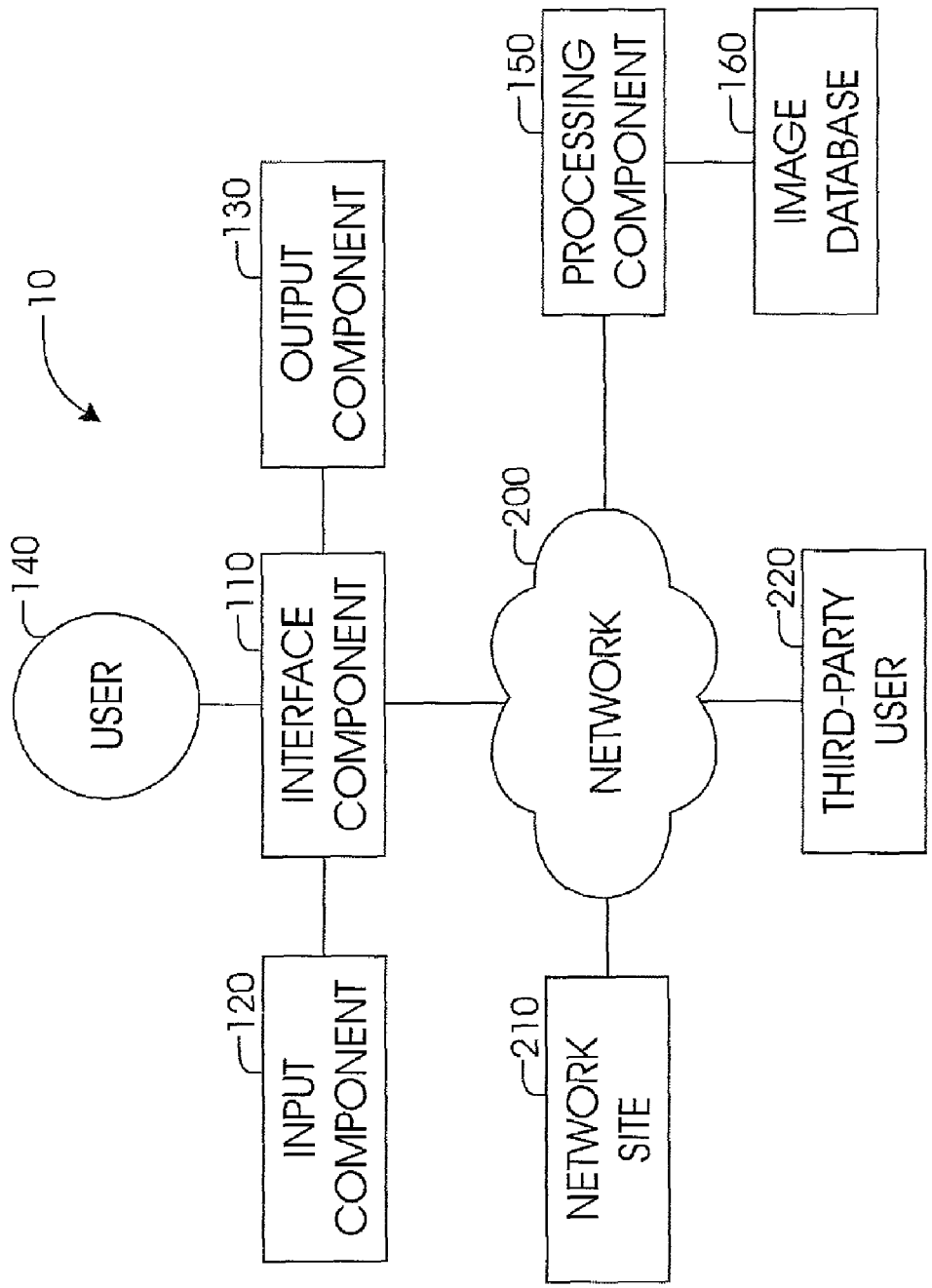
FIG. 2 is a high level diagram illustrating a network embodiment of the invention for enhancing an image collection with professional images.

Apparatus 10 for enhancing an image collection 300 (FIG. 3) is shown and described herein as it could be used with a system 100 (FIG. 1) or over a network 200 (FIG. 2). Briefly, the image collection 300 belonging to a user 140 may comprise a number of user images 310–312. For example, the user 140 may have a number of photographs or a video recording of Paris, France, that the user 140 desires to enhance by supplementing it with related professional images 320–322. Although the user 140 may purchase professional photographs, post cards, videos, etc., to supplement the image collection 300, these images are often of a different format (i.e., based on one or more attributes) from those of the image collection 300. For example, the image collection 300 may be formatted as one or more 35 mm slides. It is therefore desirable to enhance the image collection 300 with related professional image(s) 320–322 that substantially match one or more attributes (e.g., coloring, shading, brightness, size, type, lighting, resolution, focus, hue, saturation, etc.) of the user image 310–312. The present invention relates to such a method and apparatus for enhancing an image collection 300 by selecting the professional image(s) 320–322 based on one or more categories (e.g., subject, theme, scenery, landmark, geography, weather, holiday, season, time, etc.) of the user image(s) 310–312 in the image collection 300, and formatting at least one attribute thereof to substantially match at least one attribute of the user image(s) 310–312.

According to the teachings of the invention, the invention may be embodied in computer readable program code stored on computer readable storage media. The computer readable program code may comprise program code for receiving image data 500 for at least one user image 310–312 in the image collection 300. For example, the user image 310–312 may comprise a video of the Grand Canyon, as identified by the image data 500. Program code may also be provided for selecting at least one professional image 320–322 based on the image data 500. For example, the professional image 320–322 may comprise a video stream of wildlife native to the Grand Canyon, other Arizona landmarks, etc. At least one attribute of the professional image 320–322 may be formatted, using suitable program code, to substantially match at least one attribute of the user image 310–312 based at least in part on the image data 500. For example, where the image data 500 indicates that the user image 310–312 is a video clip, the professional image 320–322 may be formatted as a video stream. The professional image 320–322 may then be delivered (e.g., to a printer, to an Internet site) for inclusion with the image collection 300, using suitable program code, to enhance the image collection 300.

The apparatus 10 may be operated as follows to enhance the image collection 300 with one or more professional images 320–322. As a first step, a category of at least one user image 310–312 in the image collection 300 is determined. At least one professional image 320–322 may then be selected based on the category of the user image 310–312. Once a professional image 320–322 is selected, at least one attribute thereof may be formatted to substantially match at least one attribute of the user image 310–312. The formatted professional image 320–322 may then be delivered to a user (e.g., via a printer, via a network site, etc.) to include with, and thereby enhance, the image collection 300. As such, the image collection 300 may be enhanced with one or more professional images 320–322 that are formatted substantially the same as the user images 310–312 in the image collection 300.

According to the invention, a user 140 may use any of a variety of technologies to create, and enhance an image collection 300 with professional images 320–322 having substantially the same format (i.e., one or more attributes thereof) as the user images 310–312 in the image collection 300. For example, the user may use a video recorder, a 35 mm camera, a disposable camera, a digital camera, etc., to create the image collection 300. The user 140 is then able to supplement the user's own images with professional images 320–322. For example, the user is able to enhance the image collection 300 when the user is unable to visit various landmarks, or where the user 140 desires to include a landmark during different seasons, in better lighting, in better weather, during a sunset, etc. Or for example, a speaker may supplement a research presentation on dolphins with visual images of other marine wildlife or habitats that the researcher did not have an opportunity to visit. In addition, the image collection 300 may be viewed as a complete, homogenous collection (e.g., as a video stream, as a photo album of 35 mm photographs, a virtual or digital album, etc.).

Having generally described a method and apparatus for enhancing the image collection 300 and several advantages thereof, several embodiments of the invention will now be described in further detail.

FIG. 1 is a high level diagram illustrating an embodiment of the apparatus 10 of the invention for enhancing an image collection 300 with professional images 320–322. The apparatus 10, as shown in FIG. 1, may be embodied in a system 100, comprising an interface component 110, an input component 120, an output component 130, a processing component 150, and an image database 160. A user 140 may interact with the system 100 via the interface component 110.

It is understood that the professional images 320–322 may comprise any suitable images for enhancing the image collection 300. That is, the professional images 320–322 may be images of any suitable subject(s). In addition, the professional images 320–322 may be any suitable format, such as, but not limited to, video, digital (e.g., computer-readable bitmap files), prints, slides, etc. Furthermore, the professional images 320–322 are preferably generated by someone other than the user, but may be generated by an amateur. Likewise, the professional images 320–322 may be generated with any suitable equipment, such as, but not limited to, professional-grade photography or video equipment, a home video recorder, a disposable camera, a digital camera, to name but a few. Indeed, a combination of equipment may be used to generate the professional images 320–322. For example, a photograph may be converted to electronic format using a PC and imaging device, and edited using suitable software.

As an example of the embodiment of the apparatus 10 shown in FIG. 1, the system 100 may be a personal computer (PC) with associated hardware, operating system, peripheral devices, and/or software applications. In this example, the interface component 110 may be a graphical user interface (GUI), the input component 120 may be the hardware and software for transferring digital images from a digital camera, the output component 130 may be a color printer, and the processing component 150 may be software and hardware operating on the PC according to the teachings of the invention. The user 140 may download one or more digital images (i.e., user images 310–312) from the digital camera to the PC. According to the invention, one or more professional images 320–322 is selected from the image database 160 using suitable program code (e.g., the processing component 150) to enhance the image collection 300, as explained in more detail below.

As another example of the embodiment of the apparatus 10 shown in FIG. 1, the system 100 may be a kiosk (e.g., a dedicated PC packaged to simplify the use thereof). In this example, the kiosk may have a display (e.g., interface component 110) and a scanning bed (e.g., input component 120) visible to the user 140. The user 140 may place a photograph on the scanning bed and make an appropriate menu selection using a touch-screen on the display. Again, and according to the teachings of the invention, one or more professional images 320–322 is selected from the image database 160 using suitable program code (e.g., the processing component 150) to enhance the image collection 300, as explained in more detail below. The selected professional image 320–322 may then be provided (e.g., printed, saved to a diskette, sent via email, etc.) to the user 140 (e.g., from the output component 130).

FIG. 2 is a high level diagram illustrating another embodiment of the apparatus 10 of the invention for enhancing an image collection 300 with professional images 320–322.

The apparatus 10, as shown in FIG. 2, may be used with a network 200. Again, the apparatus 10 may comprise an interface component 110, an input component 120, and an output component 130, linked over the network 200 to a processing component 150, and an image database 160. Again, the user 140 may interact with the system 100 via the interface component 110.

As an example of the embodiment of the apparatus 10 shown in FIG. 2, the network 200 may be the Internet over which the user 140 may link to an Internet site hosting the processing component 150 and the image database 160. The user 140 may scan or download one or more user images 310–312 for transmission over the Internet to the Internet site. Again, according to the teachings of the invention, one or more professional images 320–322 is selected from the image database 160 using suitable program code (e.g., the processing component 150) to enhance the image collection 300, as explained in more detail below. The selected professional image 320–322 may then be provided (e.g., printed, saved to a diskette, sent via email, etc.) to the user 140 via the network 200. For example, the selected professional image 320–322 may be delivered to the user 140 via email, or posted to a network site 210, such as the personal web page of the user 140 to share with third-party users 220 (e.g., family, friends).

It is understood that the apparatus 10 may comprise any conventional computer now known or later developed, such as a PC, a network server, a kiosk, a handheld device, an Internet site, a dedicated e-enabled appliance, etc. The apparatus 10 is not limited to the embodiments shown and described above with respect to FIG. 1 and FIG. 2. Indeed, the apparatus 10 may comprise, for example, a kiosk linked to a central image database 160 over network 200. In addition, the computer system 100 may comprise hardware and software that is not shown in FIG. 1 and FIG. 2. Furthermore, the apparatus 10 may comprise any suitable computer readable program code. Likewise, the program code, or portions thereof, may be stored and executed on more than one device. For example, the image database 160 may be stored on an Internet site and the program code for accessing the image database 160 may be executed by processing component 150 on a local PC. It is also understood that the firmware and/or software may comprise more than one routine and/or subroutine, and may be embodied in separate components. In addition, the program code may be a stand-alone application, or may be a plug-in module for an existing application and/or operating system. Alternatively, the program code may be integrated into an application or operating system. In yet another embodiment, the program code can reside at one or more network devices (not shown), such as an administrator terminal, a server, etc.

It is also understood that the input component 120, output component 130, and processing component 150 may be any suitable hardware and/or software application for performing the respective functions. For example, the input component 120 may be a scanner, a disk drive, a combination thereof, etc. Also for example, the output component 130 may be a printer, a storage media (e.g., a floppy diskette, a compact disk (CD), etc.), a display, a film developing unit, etc. The interface component 110 may be, for example, a keyboard, a keypad, a touch-screen display, a PC mouse. Or for example, the interface component 110 may also include a graphical user interface (GUI), such as those commonly used for software applications running on the Microsoft WINDOWS® operating system, an Internet hypertext markup language (HTML) web page, etc. Or for example, the interface component 110 may also include, or be entirely embodied in, a voice command module. As yet another exemplary embodiment, the invention may be fully automated, wherein the user image 310–312 is automatically detected when the user 140 places it into the input component 120, and the interface component 110 primarily returns the status for the user 140, or may even be omitted altogether. The processing component 150 may comprise computer readable program code and the necessary processor for executing the same. The computer readable program code is explained in more detail herein.

It is further understood that one or more functions of the components 110, 120, 130, and 150 may be combined with one another, and are separately shown in FIG. 1 and in FIG. 2 merely for purposes of illustration. For example, the user images 310–312 may be in electronic format and reside on a floppy disk or CD as a computer readable file (e.g., jpg format), and the professional image 320–322 may thus be formatted as a computer readable file (e.g., also jpg format) and returned to the user 140 as such. Thus, in this example, the input component 120 and the output component 130 may, for example, both comprise a disk drive or a CD drive. Likewise, the functional components may be variously linked to one another. For example, the output component 130 may be linked to the processing component 150, wherein the professional images 320–322 are printed therefrom and delivered to the user 140 via the U.S. Postal Service or other courier. Or for example, the output component 130 may be program code for formatting and transmitting the professional images 320 over the network 200 to a network site 210, or to the user via email.

The image database 160 may take any suitable form, such as one or more single or multi-dimensional arrays for storing professional images 320–322. The professional images 320–322 may be preformatted for anticipated attributes (e.g., as 35 mm slides, as video streams, etc.). Alternatively, the professional images 320–322 may be one or more generic formats from which the professional images 320–322 may be converted to other formats. In yet another embodiment, the professional images 320–322 may be a combination thereof, wherein the professional images 320–322 are stored in one or more predetermined formats, and as additional attributes are requested and the professional images 320–322 converted thereto, the images may be further stored in the requested formats. The professional images 320–322 may be sorted therein in any suitable manner so that the professional images 320–322, or sets 330–332 thereof, may be readily selected based on the user images 310–312, as discussed in more detail below. The image database 160 may also comprise a reference table. Also for example, the image database 160 may further comprise "thumbnail" images, from which the user 140 may select one or more of the professional images 320–322.

Figure 3:
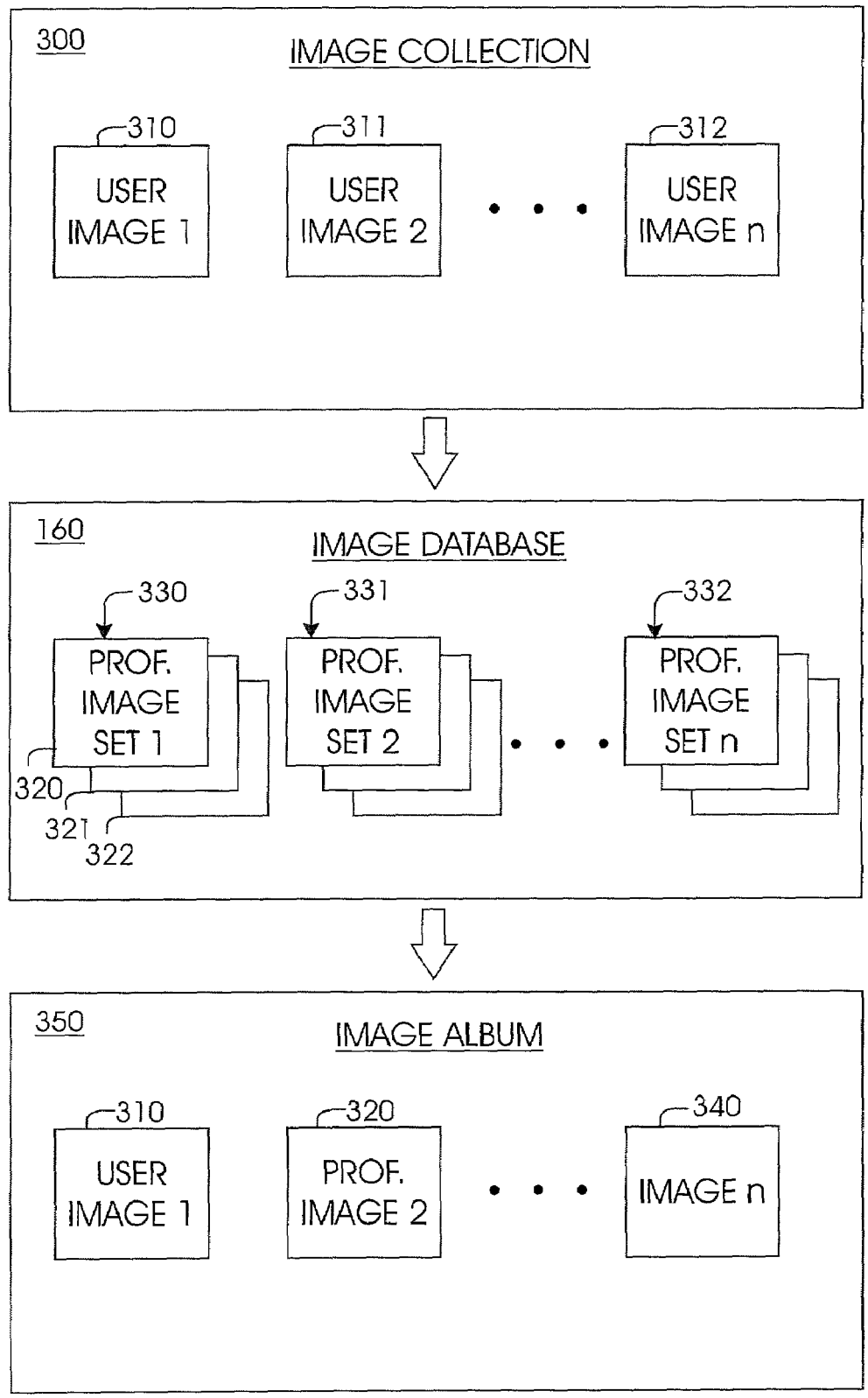
FIG. 3 is a process flow diagram illustrating an embodiment of the invention for including the professional images in the image collection.

FIG. 3 is a process flow diagram illustrating the inclusion of one or more professional images 320–322 with the image collection 300. According to one embodiment of the invention, one or more professional images 320–322 is selected from the image database 160 based on one or more of the user images 310–312 or on image data. That is, the image data 500 or one or more user images 310–312 may be representative of the image collection 300, or a portion thereof, and therefore, may be used to select the professional images 320–322. For example, a user image 310–312 may be representative of, or the image data 500 may provide, one or more attributes, themes, geographical locations, seasons, etc., of the user images 310–312 in the image collection 300.

It is understood that the image data 500 may be automatically determined based on the user images 310–312, as explained below with respect to FIG. 4. Alternatively, the user may manually submit the image data, as explained below with respect to FIG. 5. For example, the user 140 may submit a corresponding file containing the image data 500 using an online "form", by making appropriate menu selections, etc. In yet another embodiment, the categories may be determined based on a combination of user input and automatic detection thereof.

The image data 500 may be used to select one or more of the professional images 320–322 from the image database 160. Suitable program code may select one or more sets 330–332 of professional images 320–322 (e.g., grouped by theme), or one or more individual professional images 320–322. At least one attribute of the selected professional images 320–322 are formatted to substantially the same format as those in the image collection 300, and are included as part of the image collection 300. For example, an image album 350 may be automatically generated to include both the user images 310–312 and the selected professional images 320–322. Alternatively, the professional images 320–322 may be provided to the user 140 for manually including as part of the image collection 300.

It is understood that the user 140 may accept or reject individual professional images 320–322 (e.g., that have been presented to the user 140 as "thumbnail" images). In addition, the selected professional images may be included in the image album 350 in any suitable manner. Indeed, program code may be provided for integrating the selected professional images 320–322 throughout the image collection 300 based on the image data 500 of the user images 310–312. Likewise, the user 140 may select and move various of the professional images 320–322 within the image album 350.

Figure 4:
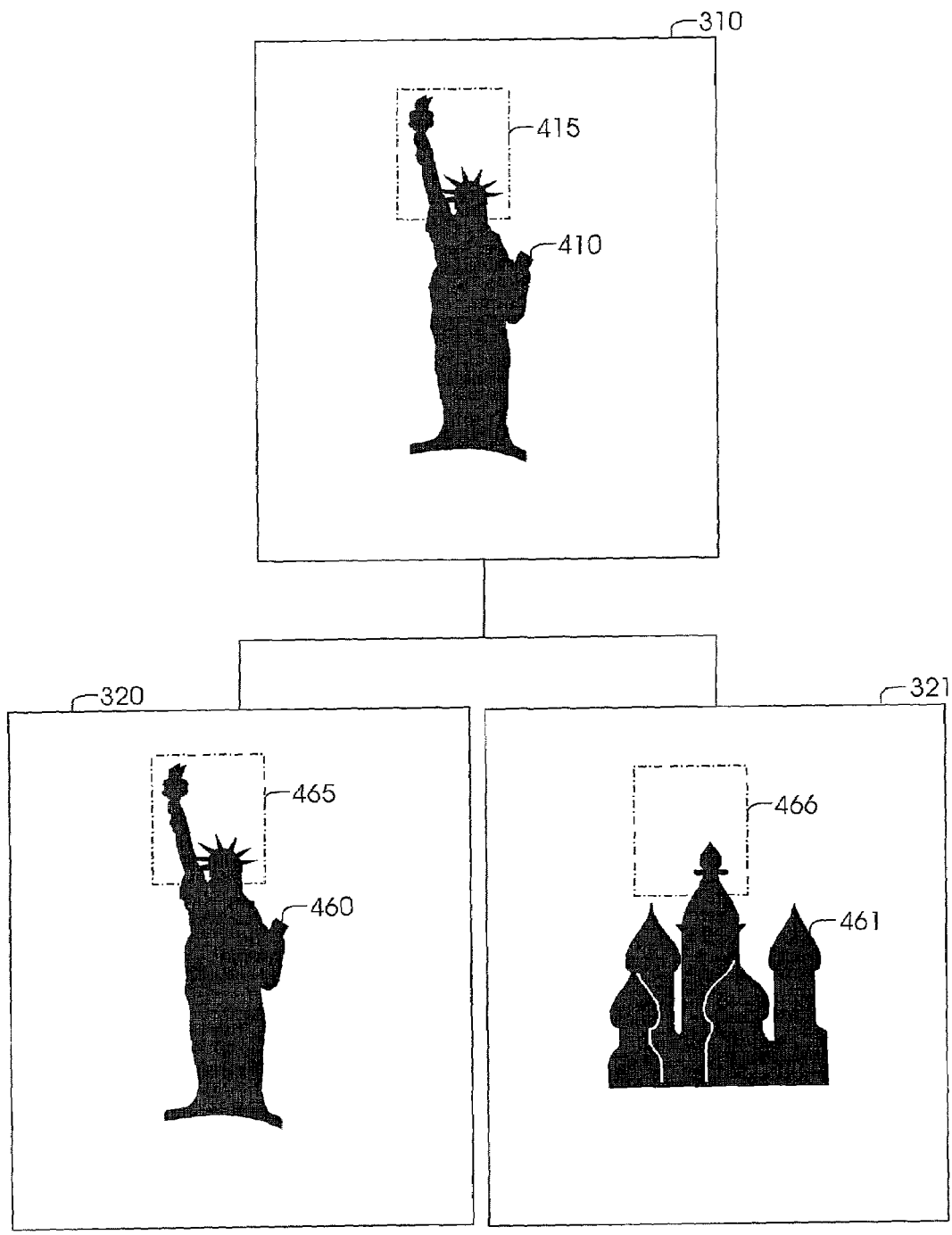
FIG. 4 illustrates an embodiment for determining image data for the user image and selecting a professional image based thereon.

FIG. 4 illustrates an embodiment of the invention for automatically selecting a professional image 320–322 based on the user images 310–312 in the image collection 300. In this example, the subject 410 of the user image 310 may be incrementally analyzed. For example, at least a portion 415 of the user image 310 may be electronically compared to at least a portion 465, 466 of the professional images 320, 321 (e.g., category images such as the subjects 460, 461 thereof). Where at least a portion 415 of the user image 310 substantially matches at least a portion 465 of the professional image 320 (e.g., similar characteristics therebetween), the matching professional image 320 is selected for inclusion with the image collection 300.

It is understood that additional embodiments for automatically selecting a professional image 320–322 based on the user images 310–312 are also contemplated as being within the scope of the invention, and that the embodiments discussed herein are merely illustrative of the invention. For example, in another embodiment, program code may also be provided for determining the image data 500 for one or more user images 310–312. For example, the program code may determine various image data 500 (e.g., attributes, subjects, etc.) for the user images 310–312. As such, the image data 500 may be compared to known image data 500 (i.e., electronic category data) for the professional images 320–322 to automatically select one or more of the professional images 320–322 for inclusion with the image collection 300.

Electronically selecting the professional image 320–322 for inclusion in the image collection 300 makes the invention easier to use and saves time for the user 140. In addition, this feature may be used "behind-the-scenes". For example, this feature may be incorporated into software applications for assembling presentations, wherein the software may make a suggestion to the user 140 to incorporate a specific professional image 320–322 in the presentation, based on the content of the presentation (e.g., the image data). Or for example, this feature of the invention may be incorporated into an Internet service for storing digital photographs, wherein the Internet service may automatically recommend a professional photograph 320–322 for inclusion with the user's 140 image collection 300.

Figure 5:
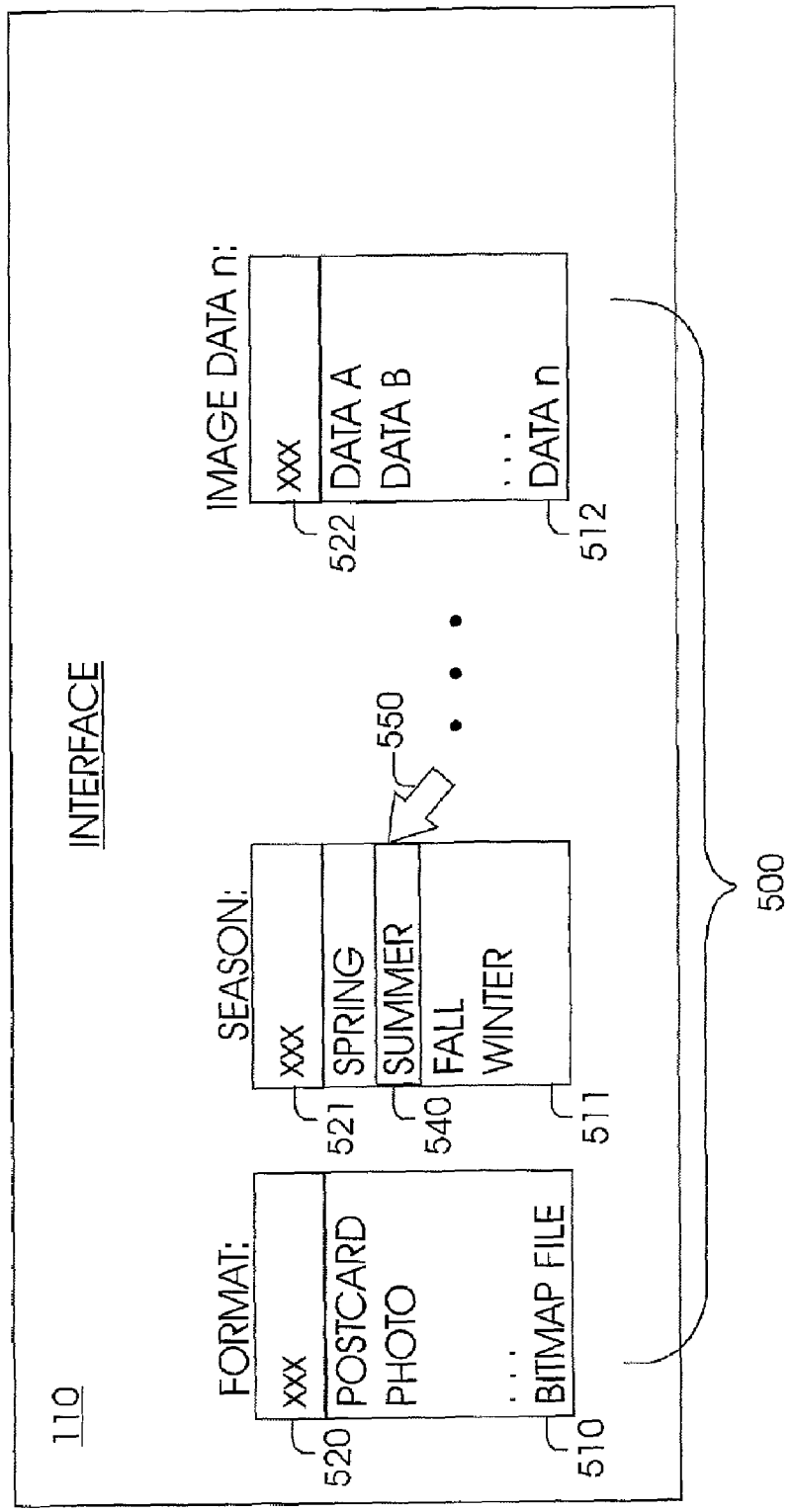
FIG. 5 shows an exemplary embodiment of an interface component of the invention for manually submitting image data.

FIG. 5 shows an exemplary user interface 110 of the apparatus 10 for selecting a professional image 320–322 based on manual entry of the image data 500 for the user images 310–312 in the image collection 300. In this exemplary embodiment, the user 140 may use the menus 510–512 and/or the text boxes 520–522 to manually specify the image data 500. For example, the user 140 may select the category "Summer" 540 using the PC mouse to move the cursor 550 to the appropriate menu 511 and click on the appropriate selection 540.

It is understood that the exemplary user interface 110 shown in FIG. 5 is merely provided as an example of a user interface 110 that may be used for manual entry of the image data 500. Other user interfaces 110 are also contemplated as being within the scope of the invention. In addition, it is also understood that the professional images 320–322 may be selected through both a combination of automatic determination and manual specification of the image data 500. For example, the apparatus 10 may electronically determine some or all of the image data 500, wherein the user may edit or further specify the image data 500.

Preferably, the user 140 may configure the apparatus 10. During configuration, the user 140 may specify that the image data 500 be automatically detected, manually entered, or a combination thereof. In addition, the user 140 may preferably also configure other aspects of the apparatus 10. For example, the user 140 may further configure the apparatus 10 so that only a predetermined number of professional images 320–322 are selected, or that entire sets 330–332 of professional images 320–322 are selected. As another example, the user may further configure the apparatus 10 to only select professional images 320–322 within a predetermined radius of the subject landmark, by season, etc. Preferably, the user 140 may also reconfigure the apparatus 10, and indeed, may even configure the apparatus 10 according to one or more profiles (e.g., a business presentation profile, a vacation profile, etc.).

Figure 6:
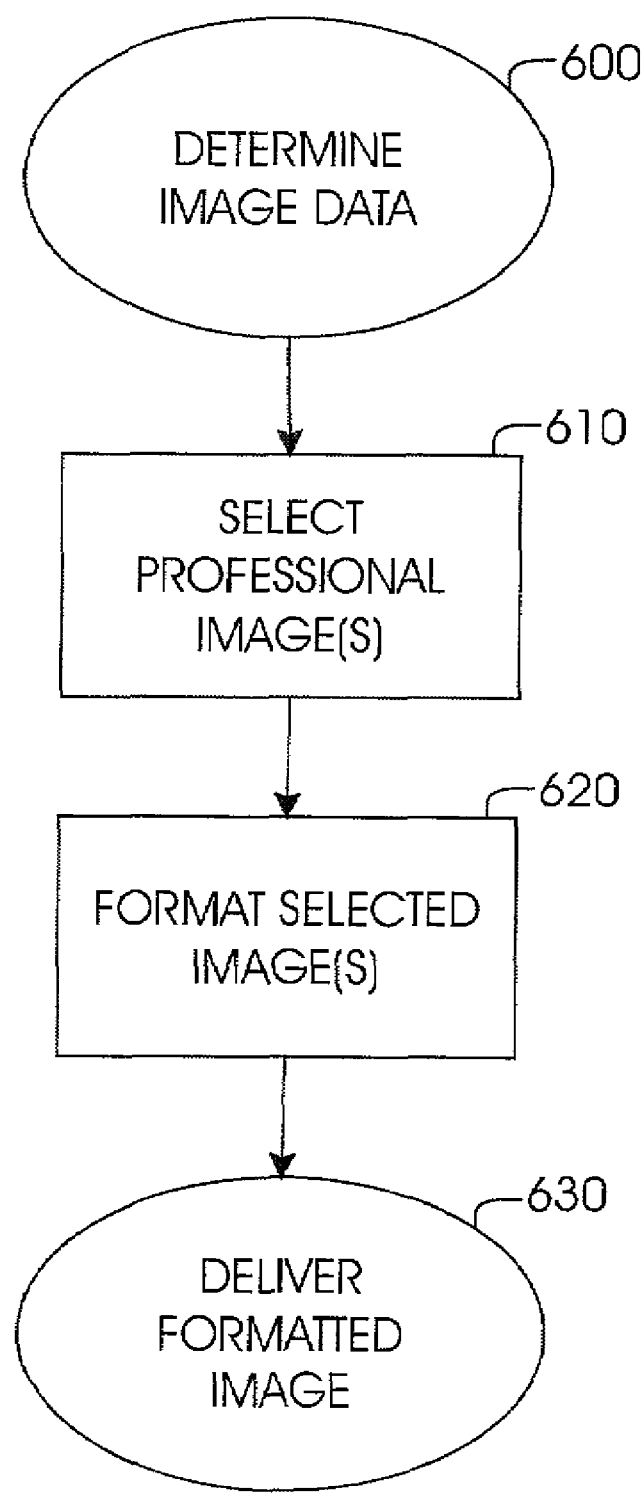
FIG. 6 is a flow diagram illustrating an embodiment of a method of the invention.

FIG. 6 is a flow diagram illustrating an embodiment of a method of the invention. In step 600, the image data 500 for the user image 310–312 is determined. The image data 500 may comprise an area, a theme, a season, etc., and/or the image data 500 may comprise a file type, number of pixels, color versus black and white, etc. Likewise, as discussed above, the image data 500 may be automatically determined, manually submitted by the user, or may be based on a combination of automatically determining and manually submitting it. Based on the user image 310–312 (e.g., the image data 500), one or more professional images 320–322 are selected in step 610. For example, where the image data 500 indicates that the image collection 300 is of national parks, one or more professional images 320–322 may comprise other national park images. In step 620, the selected professional images 320–322 are formatted, or selected from a database of preformatted images, with at least one of the attributes thereof substantially the same as that of the user images 310–312. For example, where the image data 500 indicates that the user image 310–312 is a video clip, the professional image 320–322 may be formatted as a video stream. Or for example, where the image data 500 indicates that the user image 310–312 is a 3×5 photograph, the professional image 320–322 may also be formatted as a 3×5 photograph. Or for example, where the attributes of the user image 310–312 include black-and-white, 3×5 photographs, the professional image 320–322 may also be formatted as 3×5 black-and-white photographs. It is understood that any suitable attribute(s) may be used. In step 630, the formatted professional image 320–322 is provided to the user 140 for inclusion in the image collection 300. For example, the professional image 320–322 may be printed on photographic paper and sent via the U.S. Postal Service to the user to manually combine. Or for example, the professional image 320–322 may be combined with the user images 310–312 as a digital image album and transmitted to the user's personal Internet site 210.

It is understood that the method shown in FIG. 6 and described above is merely illustrative of one embodiment, and is not intended to limit the scope of the invention thereto. Other embodiments are also contemplated as being within the teachings of the invention. For example, another embodiment of a method may comprise integrating the formatted professional image 320–322 into the image collection (e.g., as an image album 350).

What is claimed is:

1. A method for enhancing an image collection, comprising:
   providing at least a first photographic image in the image collection, the first photographic image having a first format and an attribute;
   electronically selecting from an image database at least a second photographic image, the second photographic image having a second format and an attribute;
   formatting the attribute of the second photographic image to substantially match the attribute of the first photographic image; and
   storing the formatted second photographic image in said first photographic image in the image collection, thereby enhancing the first photographic image.

2. The method of claim 1, wherein the second format is different than the first format, and the second photographic image is different than the first photographic image.

3. The method of claim 1, wherein the first format is a video clip and formatting the attribute of the second photographic image further comprises formatting the second photographic image as a video stream.

4. The method of claim 1, wherein the first format is a still photograph and formatting the attribute of the second photographic image further comprises formatting the second photographic image as a still photograph.

5. The method of claim 1, wherein the first format is a 35 mm slide and formatting the attribute of the second photographic image further comprises formatting the second photographic image as a 35 mm slide.

6. The method of claim 1, wherein the first format is a digital image and formatting the attribute of the second photographic image further comprises formatting the second photographic image as a digital image.

7. A method of software execution for enhancing an image, comprising:
   selecting a digital image of a first object, the digital image having attributes of at least color, brightness, and resolution;
   selecting a professional image of a second object different than the first object, the professional image having attributes of at least color, brightness, and resolution;
   formatting at least one of the attributes of the professional image to substantially match at least one of the attributes of the digital image; and
   adding the formatted professional digital image into the digital image to enhance the digital image of the first object.

8. The method of claim 7 wherein adding the formatted professional digital image into the digital image enhances scenery of the first object.

9. The method of claim 7 wherein adding the formatted professional digital image into the digital image adds one of geographical landmarks or wildlife images into the digital image of the first object.

10. The method of claim 7 further comprising:
    transmitting the digital image to a personal computer;
    selecting the professional image from plural different professional images stored in a database;
    transmitting, via a network, the selected professional image from the database to the personal computer.

11. The method of claim 7 further comprising:
    accessing an internet site to view a plurality of professional images;
    selecting at least one of the professional images;
    downloading the selected professional image from the internet site in order to add the selected professional image into the digital image.

12. The method of claim 7 futher comprising:
    formatting the color in the professional image to substantially match the color in the digital image;
    formatting the brightness in the professional image to substantially match the brightness in the digital image;
    formatting the resolution in the professional image to substantially match the resolution in the digital image.

13. The method of claim 7 further comprising:
    automatically selecting, based on the first object of the digital image, plural different professional images to be added into the digital image;
    presenting the plural different professional images to a user.

14. A method for enhancing an image collection, comprising:
    generating by a user at least one user image for the image collection, the user image having a fixed attribute;
    generating by a professional at least one professional image, the professional image having a formattable attribute;
    electronically selecting the professional image based on the user image;
    formatting the formattable attribute of the professional image to substantially match the fixed attribute of the user image; and
    enhancing the image collection having the at least one user image generated by the user by supplementing the at least one user image with the formatted professional image generated by the professional in order to enhance the at least one user image.

15. A method for enhancing an image collection, comprising:
    electronically determining a category and at least one attribute of at least one user image in said image collection;
    selecting at least one professional image based on said category of said at least one user image;
    formatting at least one attribute of said at least one selected professional image to substantially match said at least one attribute of said at least one user image;
    providing said at least one formatted professional image to a user for inclusion with said image collection; and integrating said at least one formatted professional image into said at least one user image in said image collection to enhance said at least one user image.

16. A method as in claim 15, wherein electronically determining said category of said at least one user image comprises:
receiving said at least one user image in electronic format; and
comparing at least a portion of said at least one user image in electronic format—to at least one of a plurality of electronic category images, wherein said category is determined based on similar characteristics therebetween.

17. A method as in claim 15, wherein electronically determining a category comprises selecting from among the following categories for said user image: subject, theme, scenery, landmark, geography, weather, holiday, season, and time.

18. A method as in claim 15, wherein formatting said at least one selected professional image comprises substantially matching at least one attribute of said at least one professional image to at least one of the following attributes of said at least one user image: coloring, shading, brightness, size, type, lighting, resolution, focus, hue, and saturation.

19. A method as in claim 15, wherein providing said at least one formatted professional image to said user comprises:
storing said at least one formatted professional image in the image collection, thereby enhancing the image collection; and
transferring said at least one formatted professional image to a network site.

20. An apparatus for enhancing an image collection, comprising:
computer-readable storage media;
computer readable program code stored on said computer-readable storage media, comprising:
program code for receiving image data for at least one user image in said image collection;
program code for selecting at least one professional image based on said image data;
program code for formatting at least one attribute of said at least one professional image based at least in part on said image data to substantially match at least one attribute of said at least one user image for inclusion with said image collection; and
adding said at least one professional image into said at least one user image to enhance said at least one user image.

21. An apparatus as in claim 20, further comprising:
program code for storing said at least one formatted professional image in the image collection, thereby enhancing the image collection.

22. An apparatus as in claim 20, wherein said image data comprises at least a category of said at least one user image.

23. An apparatus as in claim 22, further comprising program code for selecting said category from at least one of the following categories: subject, theme, scenery, landmark, geography, weather, holiday, season, and time.

24. An apparatus as in claim 20, wherein said image data comprises at least an attribute of said at least one user image.

25. An apparatus as in claim 24, further comprising program code for selecting said attribute from at least one of the following attributes: coloring, shading, brightness, size, type, lighting, resolution, focus, hue, and saturation.

26. An apparatus as in claim 20, wherein said image data comprises at least a portion of said at least one user image in electronic format.

27. An apparatus as in claim 20, wherein at least part of said image data is user-specified.

28. An apparatus as in claim 20, further comprising a graphical user interface for receiving at least a portion of said image data from a user.

29. An apparatus as in claim 20, further comprising program code for categorizing said at least one user image based on said image data.

30. An apparatus as in claim 29, wherein said program code for categorizing said at least one user image comprises:
program code for generating at least a portion of said image data based on said user image; and
program code for comparing said generated portion of said image data to category data, wherein said user image is categorized based on the similarity therebetween.

31. An apparatus as in claim 20, further comprising an image database, wherein said at least one professional image is selected from said image database.

32. An apparatus as in claim 20, further comprising program code for generating an image album having said at least one user image and said at least one professional image therein.

33. An apparatus as in claim 32, further comprising:
program code for displaying said image album; and
program code for changing the order that said at least one user image and said at least one professional image is displayed.

34. An apparatus as in claim 20, wherein said program code for providing said at least one professional image provides said at least one professional image over a network.

35. An apparatus as in claim 34, further comprising a kiosk, wherein said kiosk comprises:
an input device for receiving said image data therefrom;
a processing device for executing said computer-readable program code; and
an output device, wherein said program code for providing said at least one professional image provides said at least one professional image to a user through said output device.

36. An apparatus for enhancing an image collection, comprising:
at least one photographic image stored in the image collection by a user, the user photographic image having an attribute;
a plurality of photographic images generated by at least one professional, the plurality of professional photographic images each having an attribute;
computer-readable storage media;
computer-readable program code stored on said computer-readable storage media, comprising:
program code for selecting at least one professional photographic image from the plurality of professional photographic images;
program code for formatting only the attribute of the selected professional photographic image to substantially match the attribute of the at least one user photographic image; and
program code for storing said at least one formatted professional photographic image in the at least one user photographic image to enhance the at least one user photographic image.

37. The apparatus of claim 36, wherein the user photographic image has a fixed attribute and the professional photographic image has a formattable attribute.

38. The apparatus of claim 36, wherein the program code for selecting selects the at least one professional photographic image based on a profile.

39. The apparatus of claim 36, wherein the profile is selected from a business presentation profile and a vacation profile.

40. An apparatus for enhancing an image collection, comprising:
- an input component for receiving image data for at least one user image in said image collection;
- a processing component for:
    - selecting at least one professional image based on said image data;
    - formatting at least one attribute of said at least one professional image based at least in part on said image data to substantially match at least one attribute of said at least one user image; and
    - integrating said at least one professional image into said at least one user image to enhance said at least one user image; and
- an output component for providing said at least one formatted professional image for inclusion with and enhancement of said image collection.

41. An apparatus as in claim 40, wherein said output component further stores said at least one formatted professional image in the image collection, thereby enhancing the image collection.

* * * * *

UNITED STATES PATENT AND TRADEMARK OFFICE
CERTIFICATE OF CORRECTION

| | | |
|---|---|---|
| PATENT NO. | : 6,973,453 B2 | Page 1 of 1 |
| APPLICATION NO. | : 09/963167 | |
| DATED | : December 6, 2005 | |
| INVENTOR(S) | : Jerlyn R Culp et al. | |

It is certified that error appears in the above-identified patent and that said Letters Patent is hereby corrected as shown below:

In column 10, line 24, in Claim 12, delete "futher" and insert -- further --, therefor.

Signed and Sealed this

Twelfth Day of May, 2009

JOHN DOLL
*Acting Director of the United States Patent and Trademark Office*